(12) United States Patent
Morikawa et al.

(10) Patent No.: US 7,540,007 B2
(45) Date of Patent: May 26, 2009

(54) DISK CARTRIDGE WITH SHUTTER LOCKING MEMBER

(75) Inventors: Toru Morikawa, Kanagawa (JP);
Kazuhito Kurita, Kanagawa (JP);
Mikinori Matsuda, Kanagawa (JP);
Takahiro Yamada, Saitama (JP)

(73) Assignee: Sony Corporation, Tokyo (JP)

( * ) Notice: Subject to any disclaimer, the term of this patent is extended or adjusted under 35 U.S.C. 154(b) by 591 days.

(21) Appl. No.: 11/108,669

(22) Filed: Apr. 19, 2005

(65) Prior Publication Data

US 2005/0251819 A1    Nov. 10, 2005

(30) Foreign Application Priority Data

May 7, 2004    (JP)    ............................ 2004-138050

(51) Int. Cl.
*G11B 23/03*    (2006.01)
(52) U.S. Cl. ...................................... 720/740; 360/133
(58) Field of Classification Search ................ 720/740, 720/738, 743; 360/133
See application file for complete search history.

(56) References Cited

U.S. PATENT DOCUMENTS

| | | | | | |
|---|---|---|---|---|---|
| 4,943,880 | A | * | 7/1990 | Muehlhausen et al. | 360/133 |
| 5,073,889 | A | * | 12/1991 | Rayner | 720/739 |
| 5,546,376 | A | | 8/1996 | Taniyama | 720/740 |
| 5,764,623 | A | * | 6/1998 | Akiyama et al. | 720/726 |
| 5,923,641 | A | | 7/1999 | Fujita | 720/727 |
| 6,157,605 | A | * | 12/2000 | Mori | 720/648 |
| 6,298,034 | B1 | * | 10/2001 | Hashimoto | 720/740 |
| 6,687,215 | B1 | * | 2/2004 | Bagnell et al. | 720/740 |
| 7,086,074 | B2 | * | 8/2006 | Oishi | 720/740 |
| 7,111,313 | B2 | * | 9/2006 | Kurosawa et al. | 720/742 |

(Continued)

FOREIGN PATENT DOCUMENTS

EP    0 271 997 A2    6/1988

(Continued)

OTHER PUBLICATIONS

U.S. Appl. No. 11/108,669, filed Apr. 19, 2005, Morikawa, et al.

(Continued)

*Primary Examiner*—Brian E Miller
(74) *Attorney, Agent, or Firm*—Oblon, Spivak, McClelland, Maier & Neustadt, P.C.

(57) ABSTRACT

Disclosed herein is a disk cartridge including a disk; a cartridge body in which the disk is rotatably accommodated, the cartridge body having a recording and/or reproducing window for exposing a part of the disk; a shutter mounted on the cartridge body so as to be movable between a closed position where the window is closed by the shutter and an open position where the window is opened by sliding the shutter; a shutter locking member adapted to engage a locking portion of the cartridge body when the shutter is in the closed position, thereby limiting the movement of the shutter in the direction of opening the window; a biasing member provided on the shutter for biasing the shutter locking member in the direction of engaging the shutter locking member with the locking portion of the cartridge body; and a deformation preventing member provided in the cartridge body at a position inside of the biasing member for preventing the deformation of the biasing member inward of the cartridge body.

8 Claims, 10 Drawing Sheets

U.S. PATENT DOCUMENTS

| | | | |
|---|---|---|---|
| 2002/0075796 A1* | 6/2002 | Shiomi et al. | 369/291 |
| 2004/0042383 A1* | 3/2004 | Takishima | 369/291 |
| 2005/0028186 A1* | 2/2005 | Hertrich | 720/738 |
| 2006/0174258 A1* | 8/2006 | Kurita et al. | 720/740 |

FOREIGN PATENT DOCUMENTS

| | | | |
|---|---|---|---|
| EP | 0 393 858 A1 | 10/1990 |
| EP | 0 634 748 A2 | 1/1995 |
| EP | 0 657 882 A2 | 6/1995 |
| EP | 0 702 371 A2 | 3/1996 |
| JP | 63-72777 | 5/1988 |
| JP | 8-315537 | 11/1996 |
| WO | WO 02/061745 A2 | 8/2002 |

OTHER PUBLICATIONS

U.S. Appl. No. 10/545,403, filed Aug. 12, 2005, Kurita, et al.

* cited by examiner

DISK CARTRIDGE WITH SHUTTER LOCKING MEMBER

BACKGROUND OF THE INVENTION

The present invention relates to a disk cartridge including a disk-shaped recording medium such as an optical disk, and more particularly to a disk cartridge in which a biasing member for biasing a shutter locking member to a lock position is integral with a shutter, and the deformation of the biasing member due to an external force applied thereto can be prevented.

Figure 11:
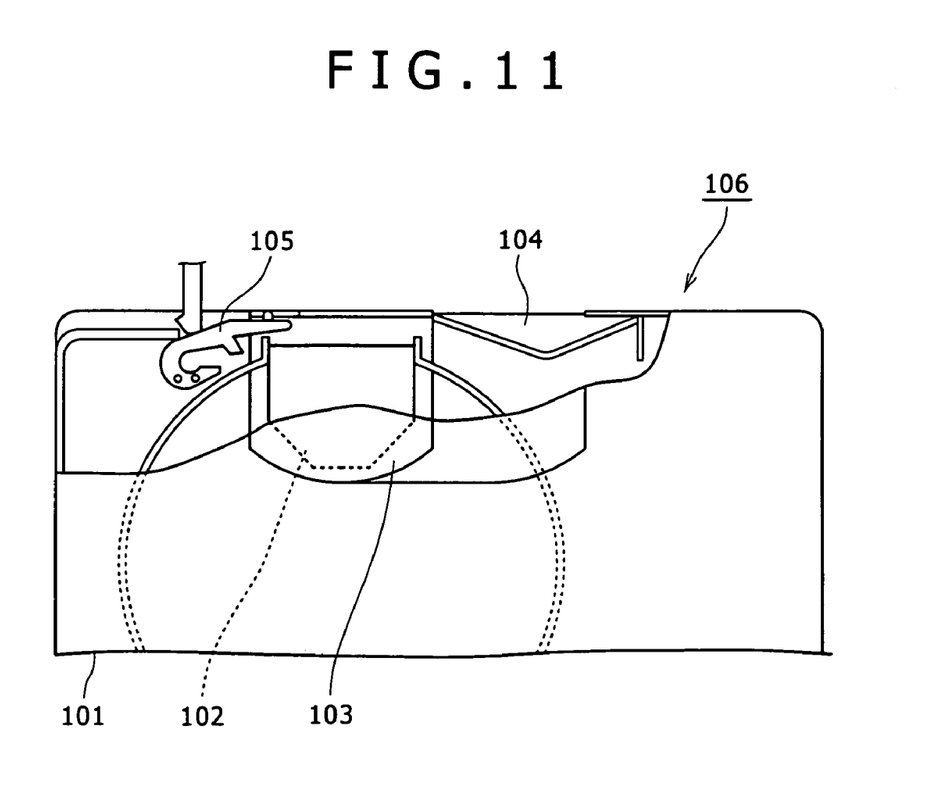
FIG. 11 is a schematic view of a disk cartridge in the related art.

FIG. 11 shows a disk cartridge 106 in the related art. The disk cartridge 106 has a cartridge body 101 formed with a recording and/or reproducing window 102. The window 102 is openably closed by a shutter 103. The shutter 103 is integrally formed with a biasing member 104 like a leaf spring for biasing the shutter 103 to a window closing position where the window 102 is closed by the shutter 103. Further, a shutter locking member 105 for locking the shutter 103 at the window closing position (see Japanese Utility Model Laid-open No. Sho 62-83274, for example).

In the above related-art disk cartridge 106, the biasing member 104 integral with the shutter 103 serves as a so-called shutter spring for biasing the shutter 103 to the window closing position where the window 102 is closed by the shutter 103, but does not serve to bias the shutter locking member 105 to a lock position. It is almost not known that a shutter locking member is biased to a lock position by a biasing member integral with a shutter.

SUMMARY OF THE INVENTION

It is accordingly an object of the present invention to provide a disk cartridge in which a biasing member for biasing a shutter locking member to a lock position is integral with a shutter, and the deformation of the biasing member due to an external force applied thereto can be prevented.

In accordance with the present invention, there is provided a disk cartridge comprising a disk; a cartridge body in which the disk is rotatably accommodated, the cartridge body having a recording and/or reproducing window for exposing a part of the disk; a shutter mounted on the cartridge body so as to be movable between a closed position where the window is closed by the shutter and an open position where the window is opened by sliding the shutter; a shutter locking member adapted to engage a locking portion of the cartridge body when the shutter is in the closed position, thereby limiting the movement of the shutter in the direction of opening the window; a biasing member provided on the shutter for biasing the shutter locking member in the direction of engaging the shutter locking member with the locking portion of the cartridge body; and a deformation preventing member provided in the cartridge body at a position inside of the biasing member for preventing the deformation of the biasing member inward of the cartridge body.

Preferably, the deformation preventing member is positioned so as to support the biasing member in the closed position of the shutter when an external force is applied to the biasing member from the outside thereof.

Preferably, the cartridge body has a side surface formed with an opening; and the biasing member is located so that the outside thereof is exposed to the opening of the cartridge body.

Preferably, the opening of the cartridge body is elongated in the direction of movement of the shutter; and the biasing member is composed of an extending portion extending from one side of the shutter in the direction of opening the window, a turning portion formed at an outer end of the extending portion, and an elastically displacing portion turned from the extending portion at the turning portion for biasing the shutter locking member in the direction of engaging the shutter locking member with the locking portion of the cartridge body.

Preferably, the cartridge body has a disk accommodating portion for accommodating the disk; the biasing member has an extending portion extending from one side of the shutter in the direction of opening the window; and the deformation preventing member is positioned between the extending portion and an inner wall defining the disk accommodating portion.

Preferably, the deformation preventing member comprises a rib adapted to come into contact with the inner surface of the biasing member when the window is closed by the shutter.

Preferably, the deformation preventing member comprises a first rib located inside of the biasing member when the window is closed by the shutter and a second rib extending from the first rib in the direction of opening the shutter.

As described above, the biasing member for biasing the shutter locking member to the lock position is integral with the shutter. Accordingly, as compared with the case that the biasing member is independent of the shutter as in the related art, the number of parts can be reduced and the step of mounting the biasing member to the shutter can be eliminated. Further, the deformation of the biasing member due to an external force applied thereto can be prevented by the deformation preventing member.

In the case that the biasing member is composed of the extending portion extending from one side of the shutter, the turning portion formed at the outer end of the extending portion, and the elastically displacing portion turned from the extending portion at the turning portion, the length of the biasing member can be increased to adjust the spring constant of the biasing member to a low value. Further, in mounting the shutter to the cartridge body, the biasing member can be easily inserted into the cartridge body through the opening formed on one side surface of the cartridge body.

The deformation preventing member is positioned between the biasing member and the inner wall defining the disk accommodating portion in the cartridge body, so that the deformation preventing member does not interfere with the rotation of the disk accommodated in the disk accommodating portion.

In the case that the deformation preventing member is formed as the rib located inside of the biasing member when the window is closed by the shutter, the inner surface of the biasing member can be widely supported by the rib when the outer surface of the biasing member is depressed through the opening of the cartridge body, thereby reliably preventing the deformation of the biasing member.

In the case that the deformation preventing member is composed of the first rib located inside of the biasing member when the window is closed by the shutter and the second rib extending from the first rib in the direction of opening the shutter, the deformation of the biasing member in the closed condition of the window can be prevented by the first rib, and the deformation of the biasing member during movement of the shutter and in the open condition of the window can be prevented by the second rib.

Other objects and features of the invention will be more fully understood from the following detailed description and appended claims when taken with the accompanying drawings.

DETAILED DESCRIPTION OF THE PREFERRED EMBODIMENTS

Figure 1:
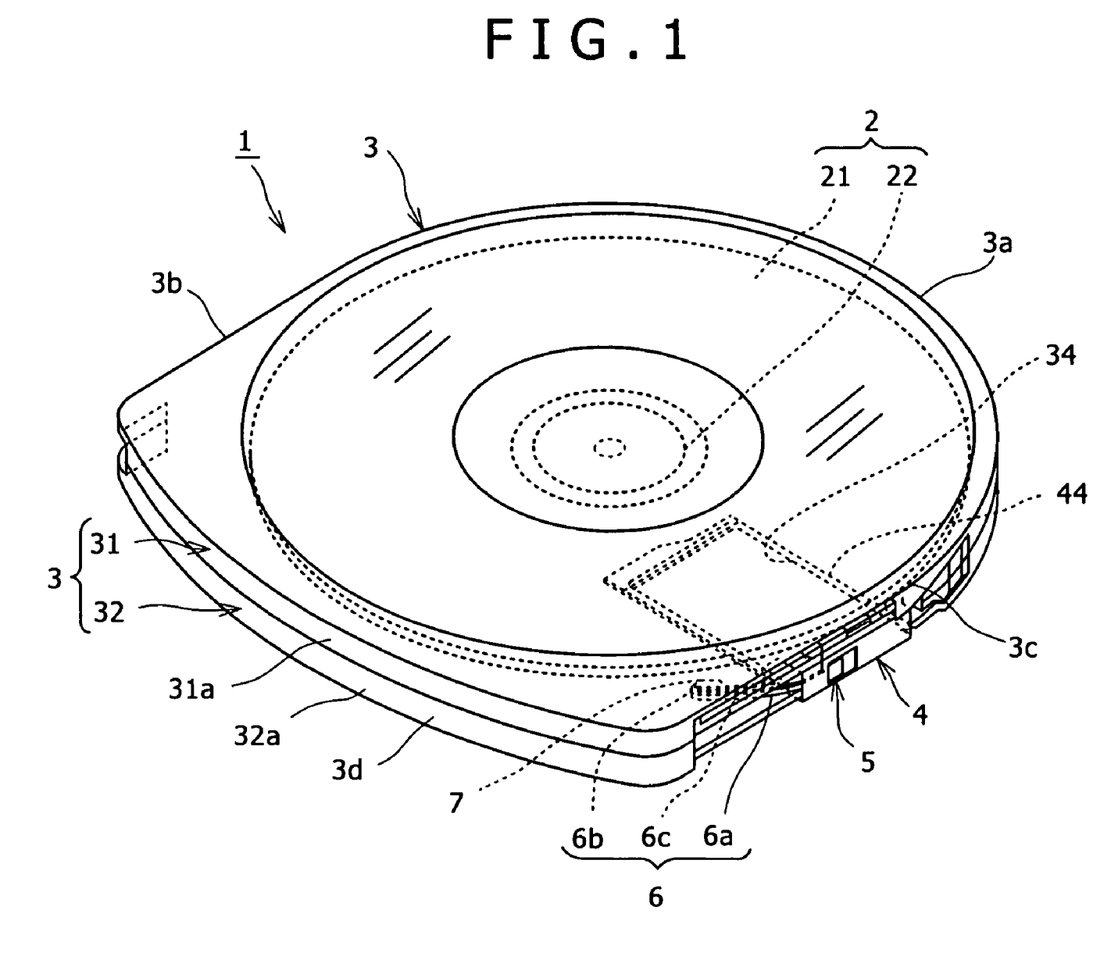
FIG. 1 is a perspective view of a disk cartridge according to a preferred embodiment of the present invention as viewed from the upper side thereof.
Figure 2:
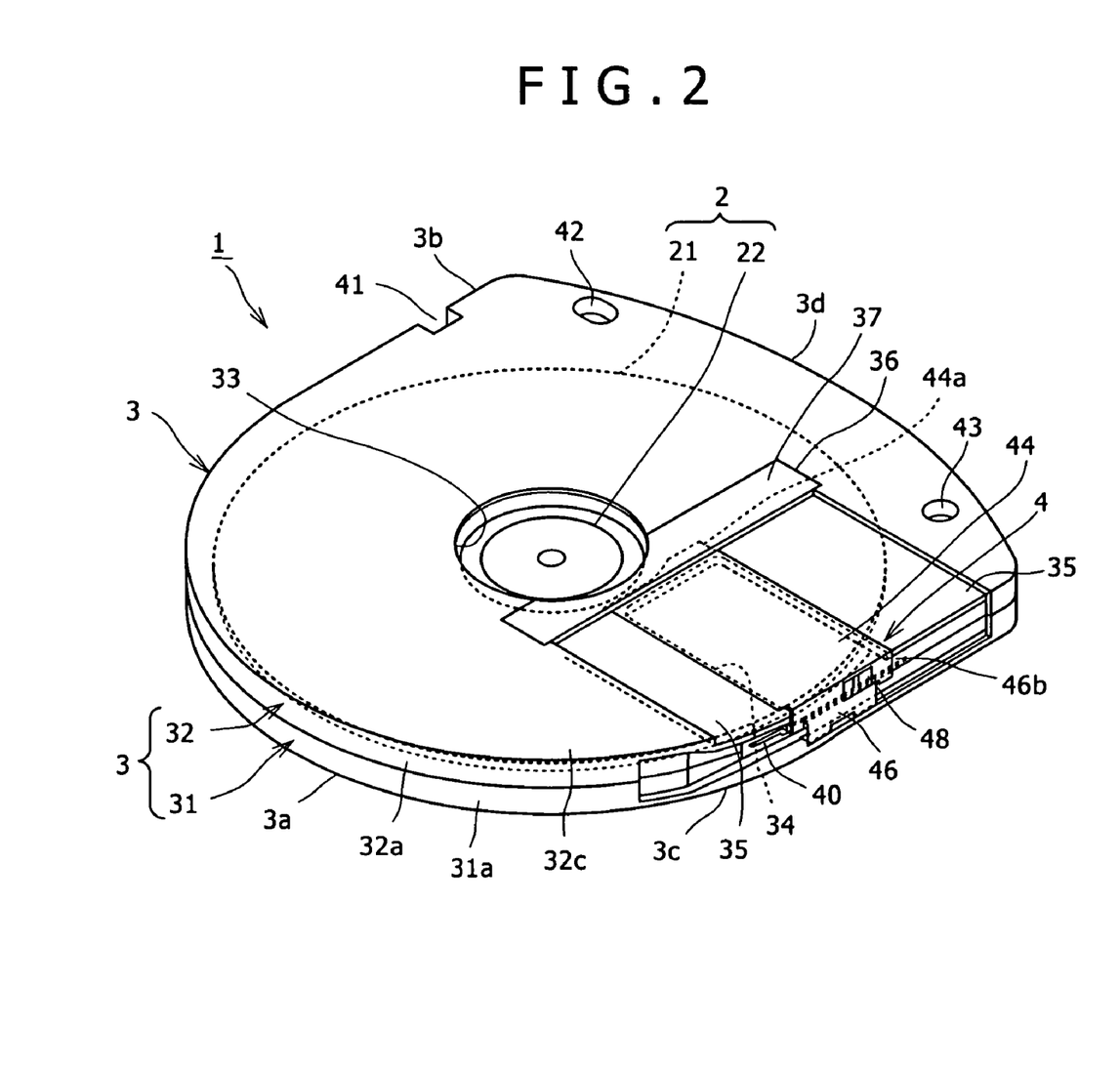
FIG. 2 is another perspective view of the disk cartridge as viewed from the lower side thereof, showing a closed condition of a shutter.
Figure 3:
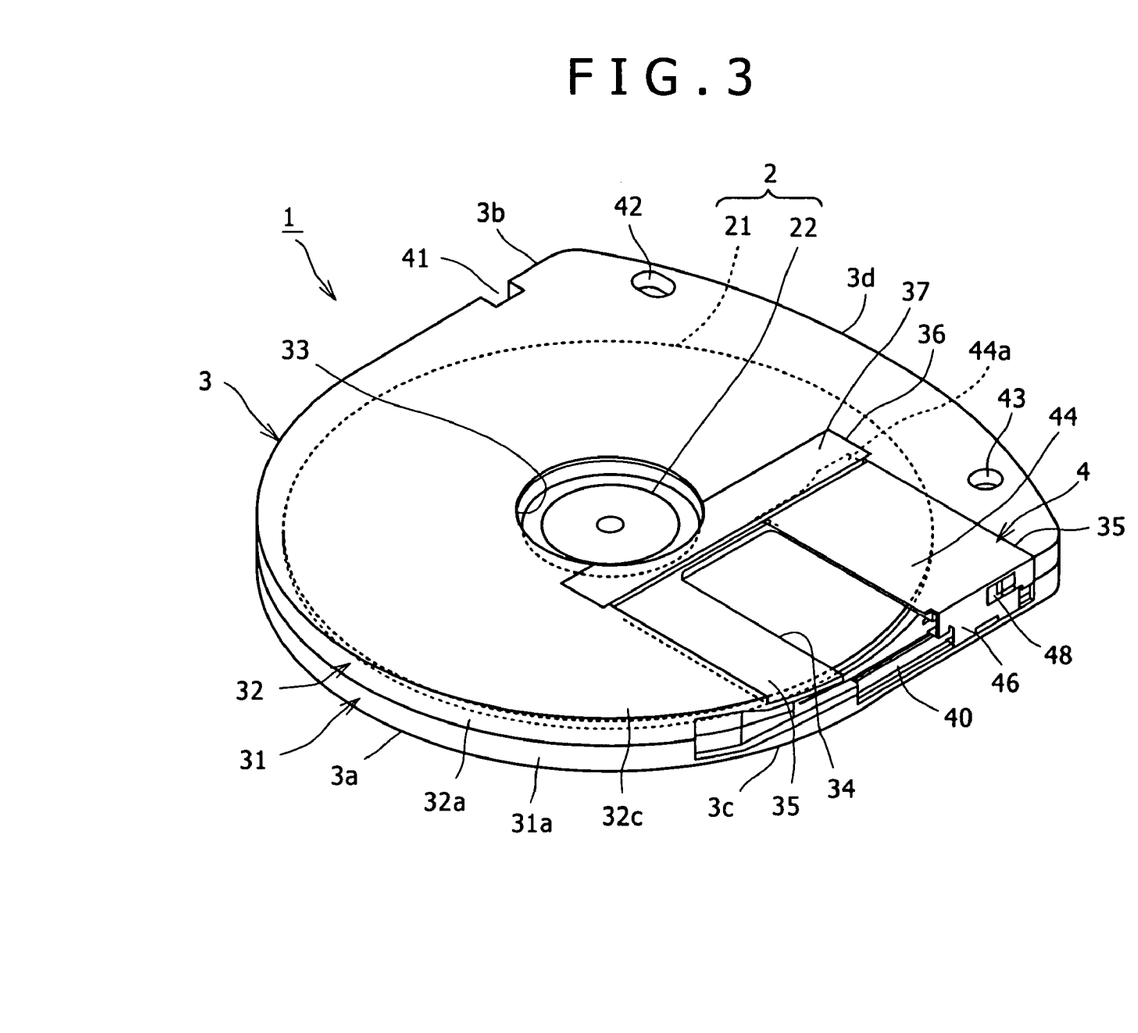
FIG. 3 is a view similar to FIG. 2, showing an open condition of the shutter.
Figure 4:
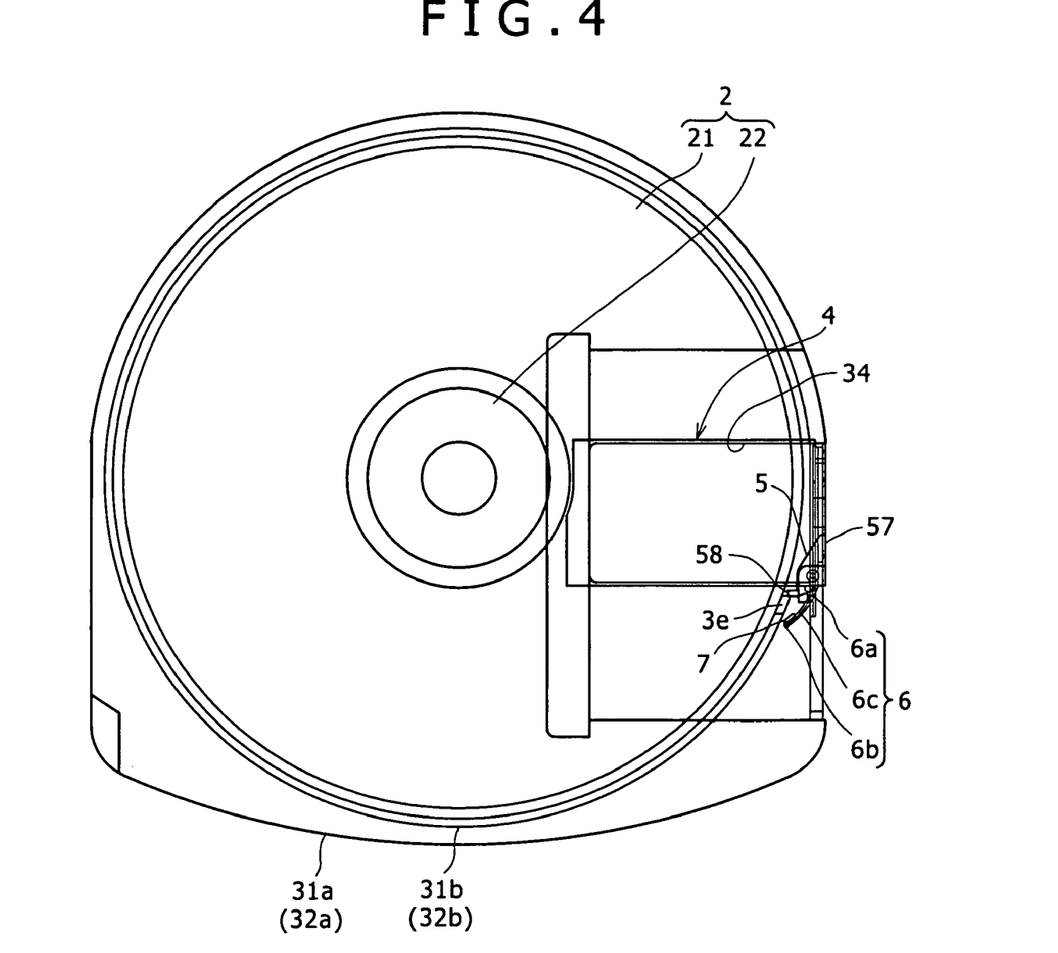
FIG. 4 is a plan view of the disk cartridge, showing a locked condition of the shutter.
Figure 5:
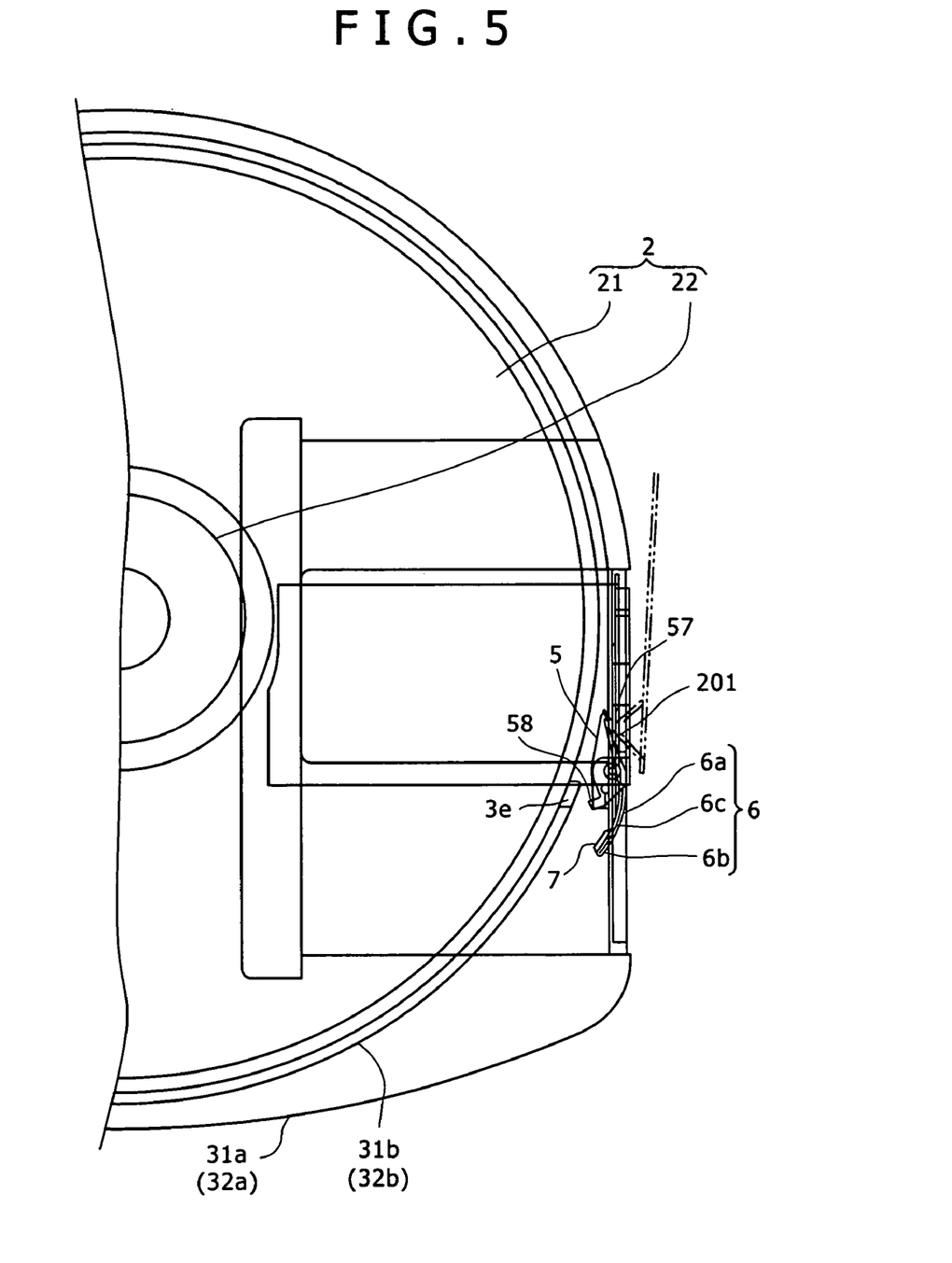
FIG. 5 is an enlarged plan view of an essential part of the disk cartridge, showing an unlocked condition of the shutter.

FIG. 1 is a perspective view of a disk cartridge 1 according to a preferred embodiment of the present invention as viewed from the upper side thereof, FIG. 2 is another perspective view of the disk cartridge 1 as viewed from the lower side thereof, FIG. 3 is a view similar to FIG. 2, showing a condition where a recording and/or reproducing window is opened by sliding a shutter, FIG. 4 is a plan view of the disk cartridge 1, showing a condition where the shutter is locked, and FIG. 5 is an enlarged plan view of an essential part of the disk cartridge 1, showing a condition where the shutter is unlocked.

As shown in FIGS. 1 to 3, the disk cartridge 1 includes a disk-shaped recording medium (disk) 2, a cartridge body 3 having a circular disk accommodating portion for rotatably accommodating the recording medium 2 and also having a recording and/or reproducing window 34 for exposing a part of the recording medium 2, a shutter 4 mounted on the cartridge body 3 so as to be movable between a closed position where the window 34 is closed by the shutter 4 and an open position where the window 34 is opened by sliding the shutter 4, a shutter locking member 5 adapted to engage a locking portion 3e (see FIG. 4) of the cartridge body 3 when the shutter 4 is in the closed position, thereby limiting the movement of the shutter 4 in the direction of opening the window 34, a biasing member 6 for biasing the shutter locking member 5 in the direction of engaging the shutter locking member 5 with the locking portion 3e of the cartridge body 3, and a deformation preventing member 7 for preventing the deformation of the biasing member 6 due to an external force applied thereto.

There will now be described the details of the recording medium 2, the cartridge body 3, the shutter 4, the shutter locking member 5, the biasing member 6, and the deformation preventing member 7.

As shown in FIGS. 1 and 2, the recording medium 2 is composed of an optical disk 21 on which game software or the like is recorded and a chucking hub 22 mounted at a central portion of the optical disk 21. The optical disk 21 has a small diameter, e.g., about 50 mm. The chucking hub 22 is formed of a magnetic metal such as stainless steel to be magnetically attracted to a magnet.

The cartridge body 3 is composed of an upper half 31 having a peripheral wall 31a and a lower half 32 having a peripheral wall 32a. The upper half 31 and the lower half 32 are joined together by making the abutment of the peripheral walls 31a and 32a. As shown in FIG. 4, the upper half 31 is formed with a circular wall 31b inside of the peripheral wall 31a. Similarly, the lower half 32 is formed with a circular wall 32b inside of the peripheral wall 32a. The circular walls 31b and 32b define a disk accommodating portion between the upper and lower halves 31 and 32.

As shown in FIG. 3, the cartridge body 3 has a front surface 3a (insert end to be inserted into a disk recording and/or reproducing device which will be hereinafter described). The front surface 3a of the cartridge body 3 is an arcuate surface (semicircular surface) having a radius of curvature substantially equal to that of the optical disk 21. The cartridge body 3 further has left and right side surfaces (which will be hereinafter referred to as first and second side surfaces, respectively) 3b and 3c continuing to the front surface 3a. The first and second side surfaces 3b and 3c of the cartridge body 3 are flat surfaces parallel to each other. The cartridge body 3 further has a rear surface 3d opposite to the front surface 3a and continuing to the first and second side surfaces 3b and 3c. The rear surface 3d of the cartridge body 3 is a gently curved surface.

The lower half 32 is formed with a central driving hole 33 for exposing the chucking hub 22 of the recording medium 2. The lower half 32 is further formed with a recording and/or reproducing window 34 for partially exposing an information recording surface of the optical disk 21 of the recording medium 2. The window 34 extends from near the central driving hole 33 to the second side surface 3c. The chucking hub 22 of the recording medium 2 is adapted to be magnetically chucked through the central driving hole 33 onto a disk table provided in the disk recording and/or reproducing device. Further, information recording and/or reproduction is performed through the window 34 to/from the optical disk 21 of the recording medium 2 by means of an optical pickup provided in the disk recording and/or reproducing device.

A first recess 35 is formed on a lower surface 32c of the lower half 32 and on the second side surface 3c. The first recess 35 is formed so as to mount the shutter 4 in such a manner that the shutter 4 does not project from the lower surface 32c and the second side surface 3c, more specifically, the shutter 4 is flush with the lower surface 32c and the second side surface 3c. Further, the first recess 35 serves to define the movable range of the shutter 4.

A second recess 36 deeper than the first recess 35 is formed on the lower surface 32c at a portion between the inner end of the first recess 35 and the central driving hole 33. As will be hereinafter described, a bent portion 44a formed at the inner end of a window closing portion 44 of the shutter 4 is received in the second recess 36. A shutter guide plate 37 is mounted on the lower half 32 so as to cover the second recess 36. The shutter guide plate 37 serves to guide the bent portion 44a of the window closing portion 44 in sliding the shutter 4 and also to prevent the bent portion 44a from being turned up. The shutter guide plate 37 is also flush with the lower surface 32c of the lower half 32.

Figure 6:
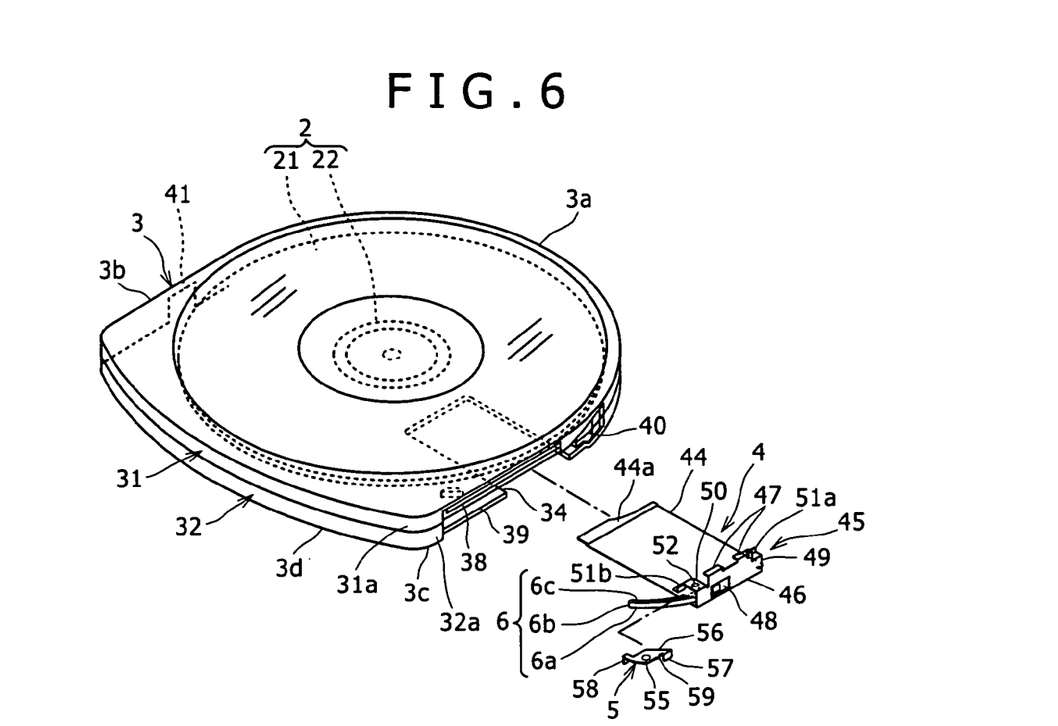
FIG. 6 is an exploded perspective view of the disk cartridge, showing a condition where the shutter is separated from a cartridge body.

As shown in FIG. 6, the peripheral wall 31a of the upper half 31 is formed with a guide groove 38 extending in the moving direction of the shutter 4 on the second side surface 3c. Further, the peripheral wall 32a of the lower half 32 is cut out at a portion on the second side surface 3c to define a shutter guide opening 39 in cooperation with the peripheral wall 31a of the upper half 31 at a portion on the second side surface 3c.

Further, a shutter unlocking member introducing groove 40 continuing to the shutter guide opening 39 is formed at a portion of the peripheral wall 32a between the second side surface 3c and the front surface 3a of the cartridge body 3. Further, a functional extension notch 41 is formed on the first side surface 3b of the cartridge body 3. As shown in FIG. 3, a pair of positioning holes 42 and 43 are formed on the lower surface 32c of the lower half 32 at a portion near the front surface 3a.

Figure 7:
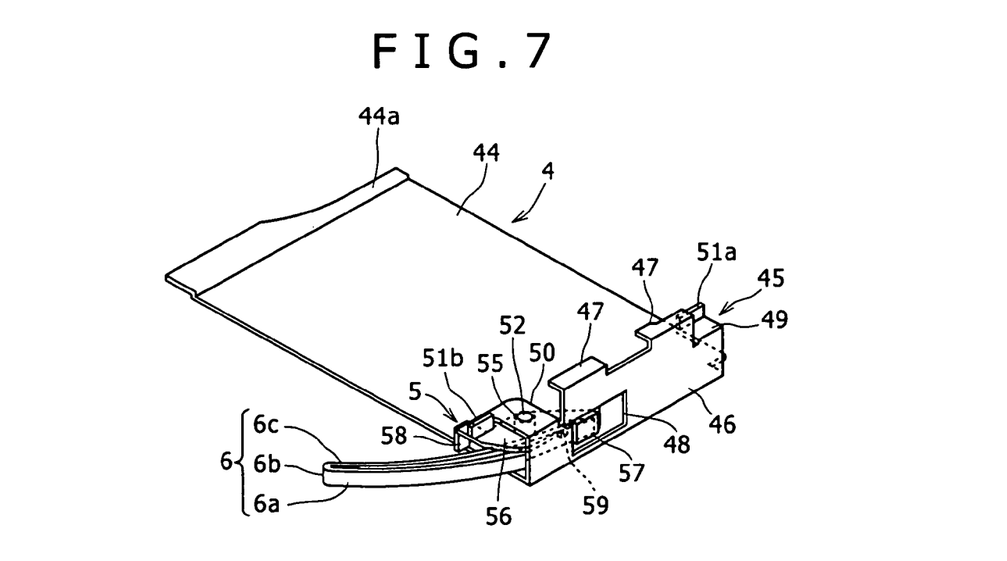
FIG. 7 is a perspective view of the shutter in the condition where a shutter locking member is mounted thereon.

As shown in FIG. 7, the shutter 4 includes a platelike window closing portion 44 for openably closing the window 34 and a mounting portion 45 for mounting the window closing portion 44 in such a manner that the window closing portion 44 received in the first recess 35 of the lower half 32 is movable between the open condition and the closed condition of the window 34.

The mounting portion 45 includes a first guide portion 46 formed by bending an outer end of the window closing portion 44 at substantially right angles thereto and a second guide portion 47 formed by bending an upper end of the first guide portion 46 at substantially right angles thereto in a direction of extension of the window closing portion 44.

The first guide portion 46 is formed at its central position with an operation opening 48 for exposing a depressed portion 57 of the shutter locking member 5 to be hereinafter described. Further, third and fourth guide portions 49 and 50 are formed at the opposite ends of the first guide portion 46 in the shutter moving direction by bending the first guide portion 46 at its vertically central position in the direction of thickness of the cartridge body 3 so as to extend in substantially parallel to the second guide portion 47. These third and fourth guide portions 49 and 50 are formed at their inner ends with engaging portions 51a and 51b, respectively. The engaging portions 51a and 51b are formed by bending the third and fourth guide portions 49 and 50 at substantially right angles thereto so as to extend away from the window closing portion 44. Further, a bosslike shaft portion 52 for pivotably mounting the shutter locking member 5 is formed on the lower surface of the fourth guide portion 50. The shutter 4 is formed by bending a metal plate punched into a predetermined shape.

Figure 8:
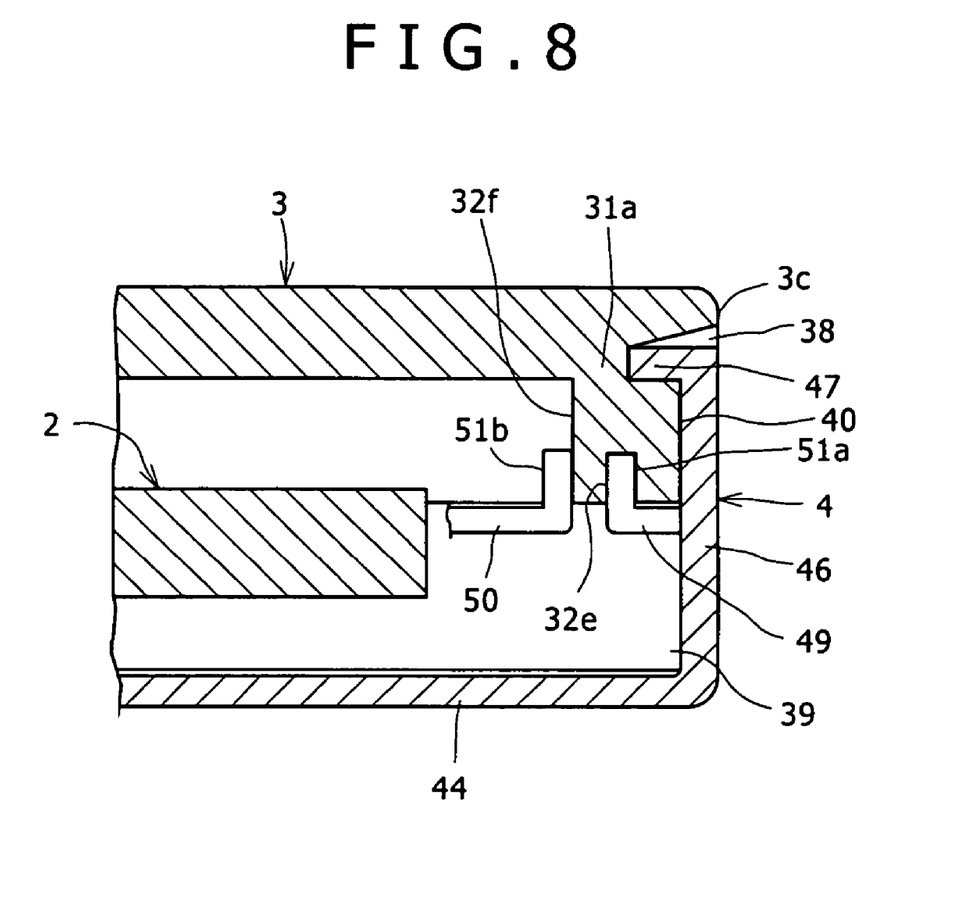
FIG. 8 is a sectional view showing a mounted condition of the shutter.

As shown in FIG. 8, the first guide portion 46 is received in the shutter unlocking member introducing groove 40 formed on the second side surface 3c of the cartridge body 3, and the second guide portion 47 is inserted in the guide groove 38 formed on the upper half 31. The third and fourth guide portions 49 and 50 are inserted from the shutter guide opening 39 into the cartridge body 3. The engaging portion 51a of the third guide portion 49 is engaged with a groove 32e formed on the lower surface of the peripheral wall 31a of the upper half 31, and the engaging portion 51b of the fourth guide portion 50 is engaged with an inner surface 32f of the peripheral wall 31a of the upper half 31. In this manner, the shutter 4 is slidably mounted on the second side surface 3c of the cartridge body 3.

When the shutter 4 slides toward the front surface 3a of the cartridge body 3 as shown in FIG. 2, the window 34 is closed by the window closing portion 44 of the shutter 4, whereas when the shutter 4 slides toward the rear surface 3d of the cartridge body 3, the window 34 is opened as shown in FIG. 3.

As shown in FIGS. 6 and 7, the shutter locking member 5 includes a platelike body portion 56 having a central bearing hole 55, a depressed portion 57 formed at one end of the body portion 56, and an engaging portion 58 formed at the other end of the body portion 56. Further, the body portion 56 is formed with a projection 59 near the depressed portion 57. The depressed portion 57 and the engaging portion 58 are formed by bending one end and the other end of the body portion 56 at substantially right angles thereto in the same direction. The shutter locking member 5 is formed by bending a metal plate punched into a predetermined shape.

The shutter locking member 5 is pivotably mounted to the fourth guide portion 50 of the shutter 4 by inserting the shaft portion 52 of the fourth guide portion 50 through the bearing hole 55 of the shutter locking member 5. When the shutter locking member 5 is pivotably moved about the shaft portion 52 of the shutter 4 to a position where the projection 59 abuts against the inner surface of the first guide portion 46 of the shutter 4, the depressed portion 57 is exposed to the operation opening 48 of the first guide portion 46 of the shutter 4 as shown in FIG. 2, and the engaging portion 58 becomes engageable with the locking portion 3e of the cartridge body 3 as shown in FIG. 4, thereby preventing the movement of the shutter 4.

The biasing member 6 is composed of an extending portion 6a extending from the one side of the shutter 4 toward the rear surface 3d of the cartridge body 3, a turning portion 6b formed at an outer end of the extending portion 6a, and an elastically displacing portion 6c turned from the extending portion 6a at the turning portion 6b to extend to a position behind the depressed portion 57 of the shutter locking member 5.

The extending portion 6a is curved so as to be inserted from the shutter guide opening 39 into the cartridge body 3 in mounting the shutter 4 to the cartridge body 3. The elastically displacing portion 6c is also curved so as to face the inner surface of the extending portion 6a, and has an operating end for depressing the depressed portion 57 of the shutter locking member 5 from the inside thereof to expose the depressed portion 57 to the operation opening 48 of the first guide portion 46 of the shutter 4. The extending portion 6a can adjust the elasticity of the biasing member 6.

In the condition where the window 34 is closed by the shutter 4 as shown in FIG. 4, the depressed portion 57 of the shutter locking member 5 is depressed by the operating end of the elastically displacing portion 6c of the biasing member 6 to pivotally move the shutter locking member 5 about the shaft portion 52 of the shutter 4 in the clockwise direction as viewed in FIG. 4, thereby locating the engaging portion 58 of the shutter locking member 5 at a position where it is engageable with the locking portion 3e of the cartridge body 3. Even when the shutter 4 is tried to be moved in the direction of opening the window 34, the engaging portion 58 of the shutter locking member 5 comes into engagement with the locking portion 3e of the cartridge body 3 to thereby lock the shutter 4. When the disk cartridge 1 is inserted into a cartridge holder provided in the disk recording and/or reproducing device, a shutter unlocking member 201 of a leaf spring provided on a side surface of the cartridge holder is introduced into the operation opening 48 of the first guide portion 46 of the shutter 4 to depress the depressed portion 57 of the shutter locking member 5 against the biasing force of the biasing member 6 as shown in FIG. 5. Accordingly, the shutter locking member 5 is pivotally moved about the shaft portion 52 of the shutter 4 in the counterclockwise direction as viewed in FIG. 5, thereby disengaging the engaging portion 58 from the locking portion 3e. In this condition, the shutter 4 is allowed to be moved in the direction of opening the window 34.

Figure 9:
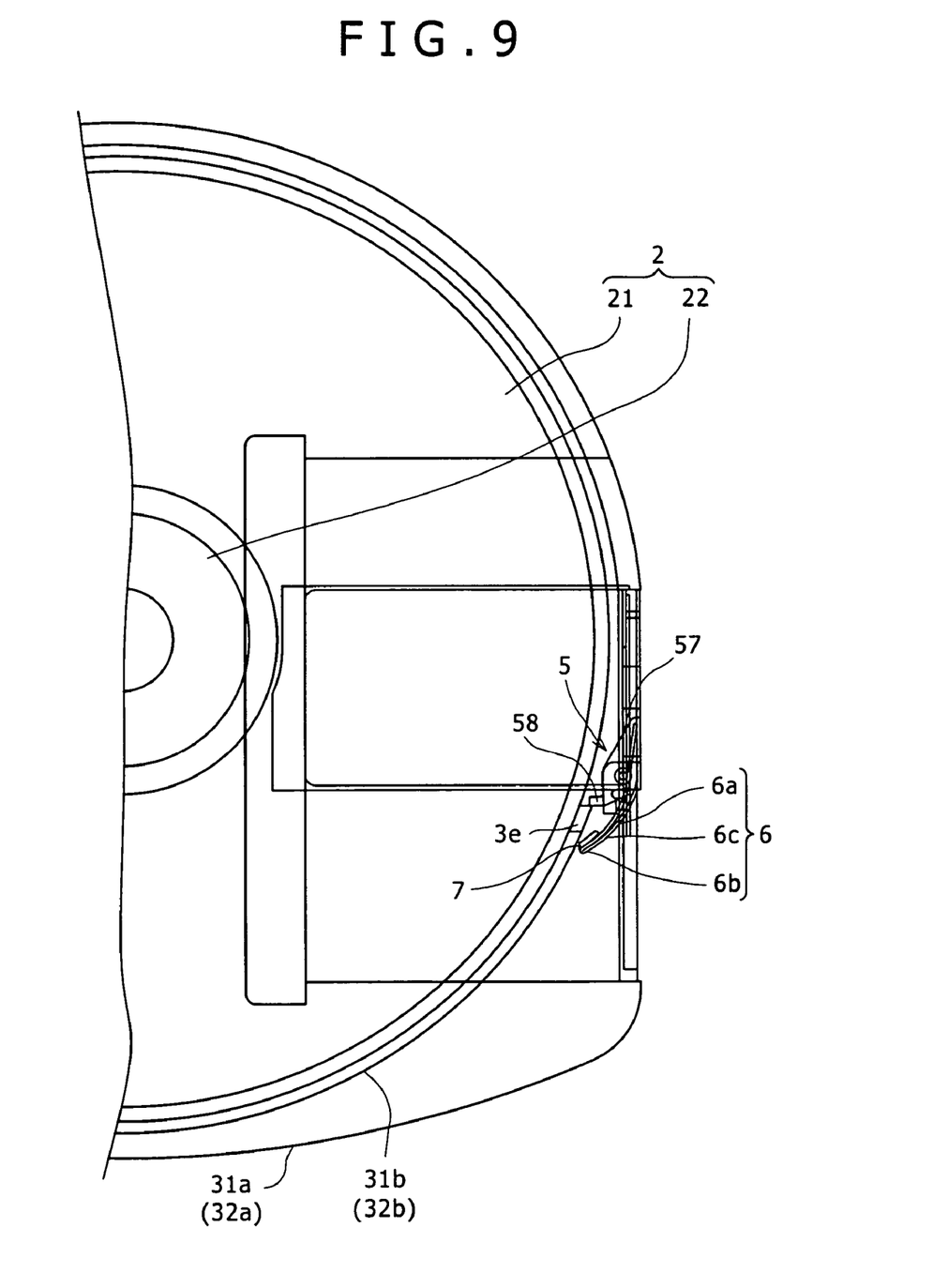
FIG. 9 is an enlarged plan view of an essential part of the disk cartridge, showing a deformation preventing member.

As shown in FIG. 9, the deformation preventing member 7 is located between the biasing member 6 and the circular walls 31b and 32b defining the disk accommodating portion in the cartridge body 3.

The deformation preventing member 7 is formed as an arcuate rib adapted to come into surface contact with the inner surface of the biasing member 6 (more specifically, the inner surface of the elastically displacing portion 6c of the biasing member 6) when the window 34 is closed by the shutter 4. Accordingly, in the event that the outer surface of the biasing member 6 is depressed through the opening 39 formed on the second side surface 3c of the cartridge body 3, the biasing member 6 can be supported from its inner side in a wide range by the arcuate rib 7, thereby reliably preventing the deformation of the biasing member 6.

Figure 10:
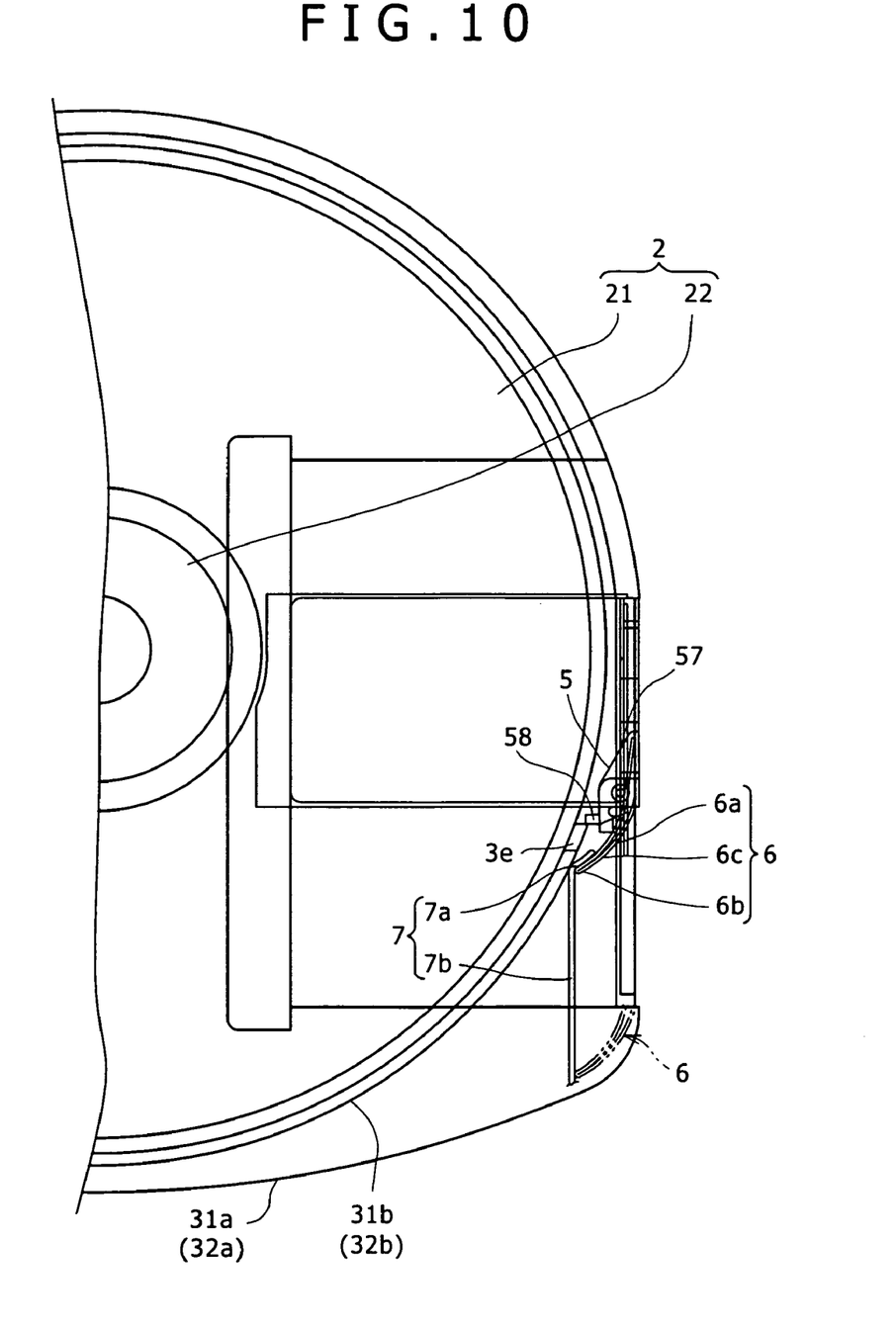
FIG. 10 is a view similar to FIG. 9, showing a modification of the deformation preventing member.

FIG. 10 shows a modification of the deformation preventing member 7. In this modification, the deformation preventing member 7 is composed of an arcuate rib (first rib) 7a adapted to come into surface contact with the inner surface of the biasing member 6 when the window 34 is closed by the shutter 4 and a straight rib (second rib) 7b extending from one end of the arcuate rib 7a in the opening direction of the shutter 4 within the range of movement thereof and adapted to come into contact with the biasing member 6 during movement of the shutter 4 and in the open condition of the shutter 4. Accordingly, when the window 34 is closed by the shutter 4, the deformation of the biasing member 6 is prevented by the arcuate rib 7a, whereas when the window 34 is opened by moving the shutter 4, the deformation of the biasing member 6 is prevented by the straight rib 7b.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A disk cartridge comprising:
   a disk;
   a cartridge body including an accommodating portion in which said disk is rotatably accommodated, said cartridge body having a recording and/or reproducing window for exposing a part of said disk;
   a shutter mounted on said cartridge body so as to be movable between a closed position where said window is closed by said shutter and an open position where said window is opened by sliding said shutter;
   a shutter locking member adapted to engage a locking portion of said cartridge body when said shutter is in said closed position, thereby limiting the movement of said shutter in the direction of opening said window;
   a biasing member provided on and integrated with said shutter, the biasing member configured to bias said shutter locking member in the direction of engaging said shutter locking member with said locking portion of said cartridge body; and
   a deformation preventing member provided in said cartridge body at a position between said biasing member and the accommodating portion, to prevent the deformation of said biasing member in a direction inward of said cartridge body.

2. A disk cartridge according to claim 1, wherein said deformation preventing member is positioned so as to support said biasing member in said closed position of said shutter when an external force is applied to said biasing member from the outside thereof.

3. A disk cartridge according to claim 1, wherein said cartridge body has a side surface formed with an opening; and
   said biasing member is located so that the outside thereof is exposed to said opening of said cartridge body.

4. A disk cartridge according to claim 3, wherein said opening of said cartridge body is elongated in the direction of movement of said shutter; and
   said biasing member is composed of an extending portion extending from one side of said shutter in the direction of opening said window, a turning portion formed at an outer end of said extending portion, and an elastically displacing portion turned from said extending portion at said turning portion for biasing said shutter locking member in the direction of engaging said shutter locking member with said locking portion of said cartridge body.

5. A disk cartridge according to claim 1, wherein said cartridge body has a disk accommodating portion for accommodating said disk;
   said biasing member has an extending portion extending from one side of said shutter in the direction of opening said window; and
   said deformation preventing member is positioned between said extending portion and an inner wall defining said disk accommodating portion.

6. A disk cartridge according to claim 1, wherein said deformation preventing member comprises a rib adapted to come into contact with the inner surface of said biasing member when said window is closed by said shutter.

7. A disk cartridge according to claim 1, wherein said deformation preventing member comprises a first rib located inside of said biasing member when said window is closed by said shutter and a second rib extending from said first rib in the direction of opening said shutter.

8. A disk cartridge according to claim 1, wherein
   the deformation preventing member is provided in said cartridge body at an end of said biasing member.

* * * * *